J. F. KOHLER.
PIE MAKING MACHINE.
APPLICATION FILED DEC. 2, 1908.

985,603.

Patented Feb. 28, 1911.

4 SHEETS—SHEET 1.

WITNESSES

INVENTOR

BY

ATTORNEY

J. F. KOHLER.
PIE MAKING MACHINE.
APPLICATION FILED DEC. 2, 1908.

985,603.

Patented Feb. 28, 1911.

4 SHEETS—SHEET 3.

J. F. KOHLER.
PIE MAKING MACHINE.
APPLICATION FILED DEC. 2, 1908.
985,603.
Patented Feb. 28, 1911.
4 SHEETS—SHEET 4.
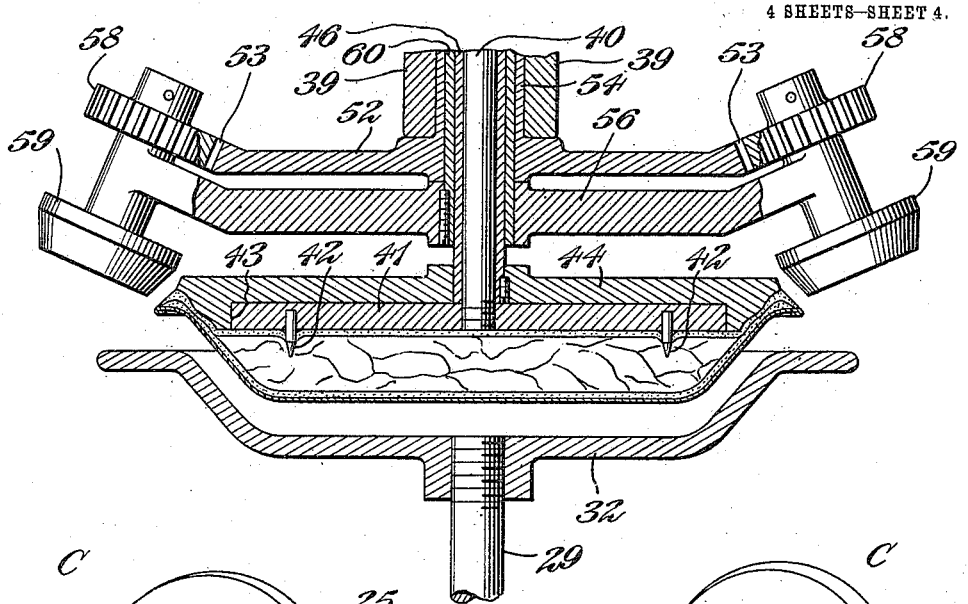
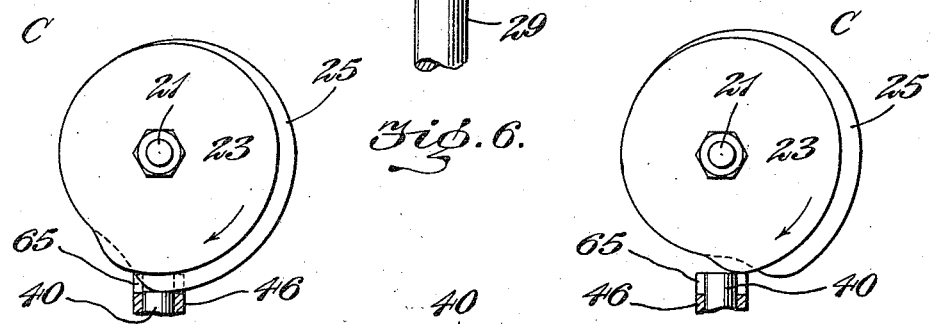
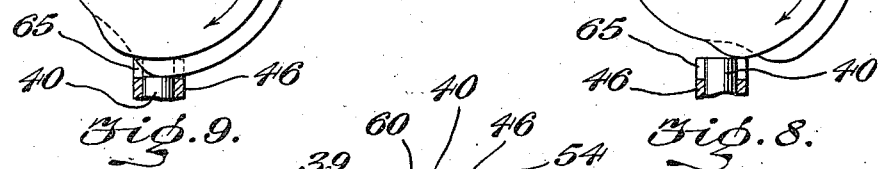
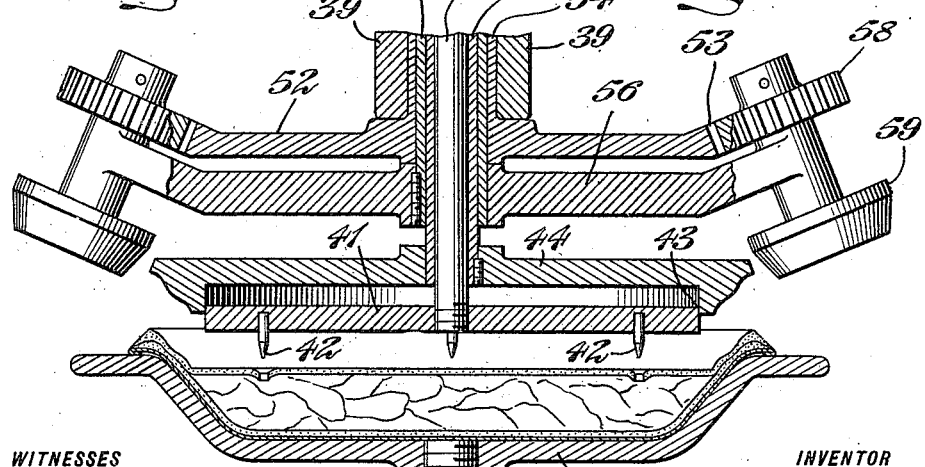
WITNESSES
INVENTOR
John F. Kohler
ATTORNEY

# UNITED STATES PATENT OFFICE.

JOHN F. KOHLER, OF NEW YORK, N. Y.

PIE-MAKING MACHINE.

985,603. Specification of Letters Patent. Patented Feb. 28, 1911.

Application filed December 2, 1908. Serial No. 465,672.

*To all whom it may concern:*

Be it known that I, JOHN F. KOHLER, a citizen of the United States, and a resident of the city and State of New York, have invented certain Improvements in Pie-Making Machines, of which the following is a specification.

This invention relates to certain improvements in pie making machines, and more particularly in that class of such machines, commonly termed "rimming" or "pinching machines" which are especially designed and intended for use in forming or molding the edges of the pie crust, and the object of the invention is to provide a machine of this general character of a simple and comparatively inexpensive nature, and of a compact, strong and durable construction having means of an improved and novel description for preventing adherence of the pies or crusts thereof to the forming or molding means, in order that the machine may be operated in a comparatively rapid and effective manner without undue liability of injury to the product.

The invention consists in certain novel features of the construction and combinations and arrangements of the several parts of the improved pie making machine, whereby certain important advantages are attained, and the device is rendered simpler less expensive, and otherwise better adapted and more convenient for use, all as will be hereinafter fully set forth.

The novel features of the invention will be carefully defined in the claims.

In order that my invention may be the better understood, I will now proceed to describe the same with reference to the accompanying drawings, wherein—

Figure 1:
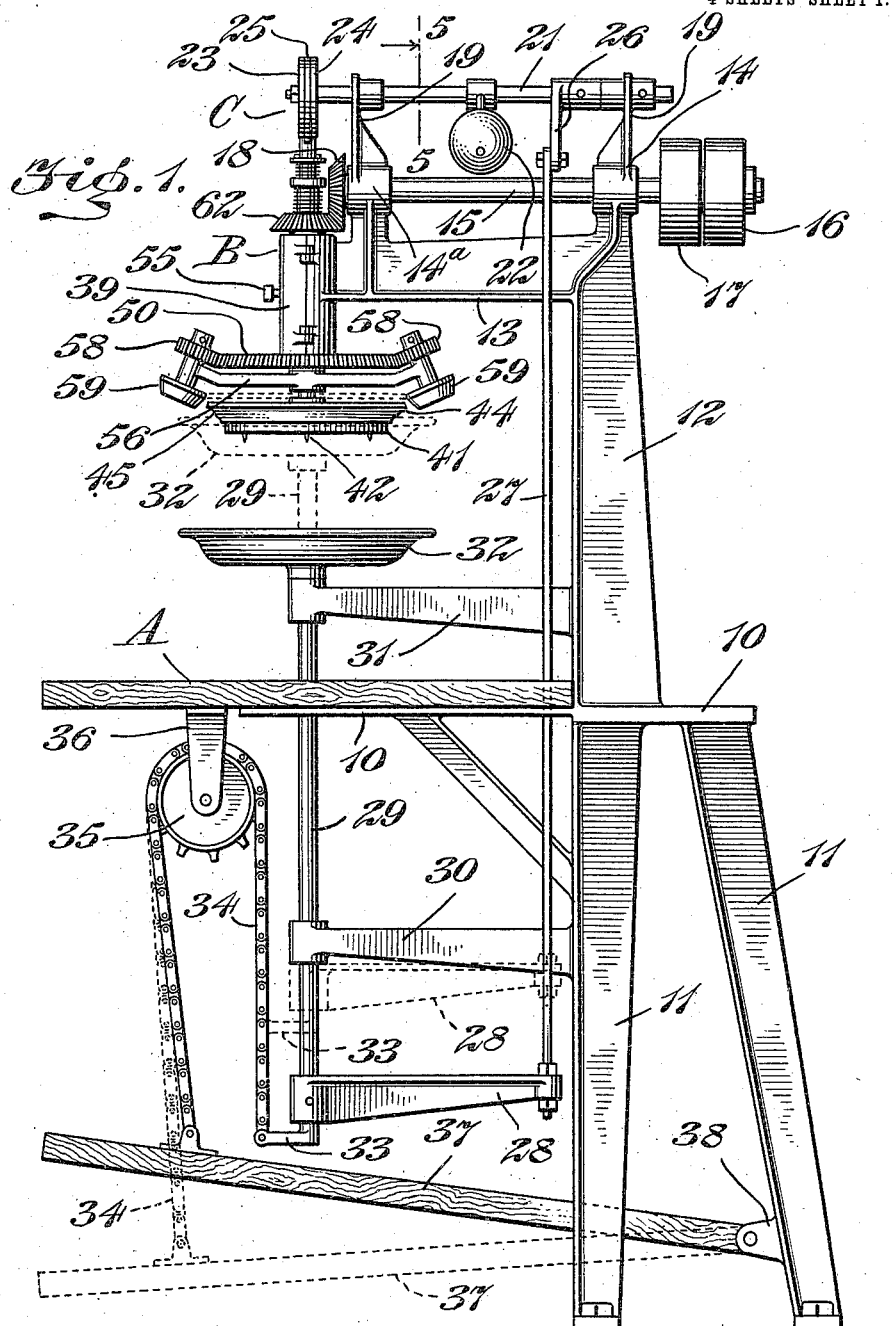
Figure 2:
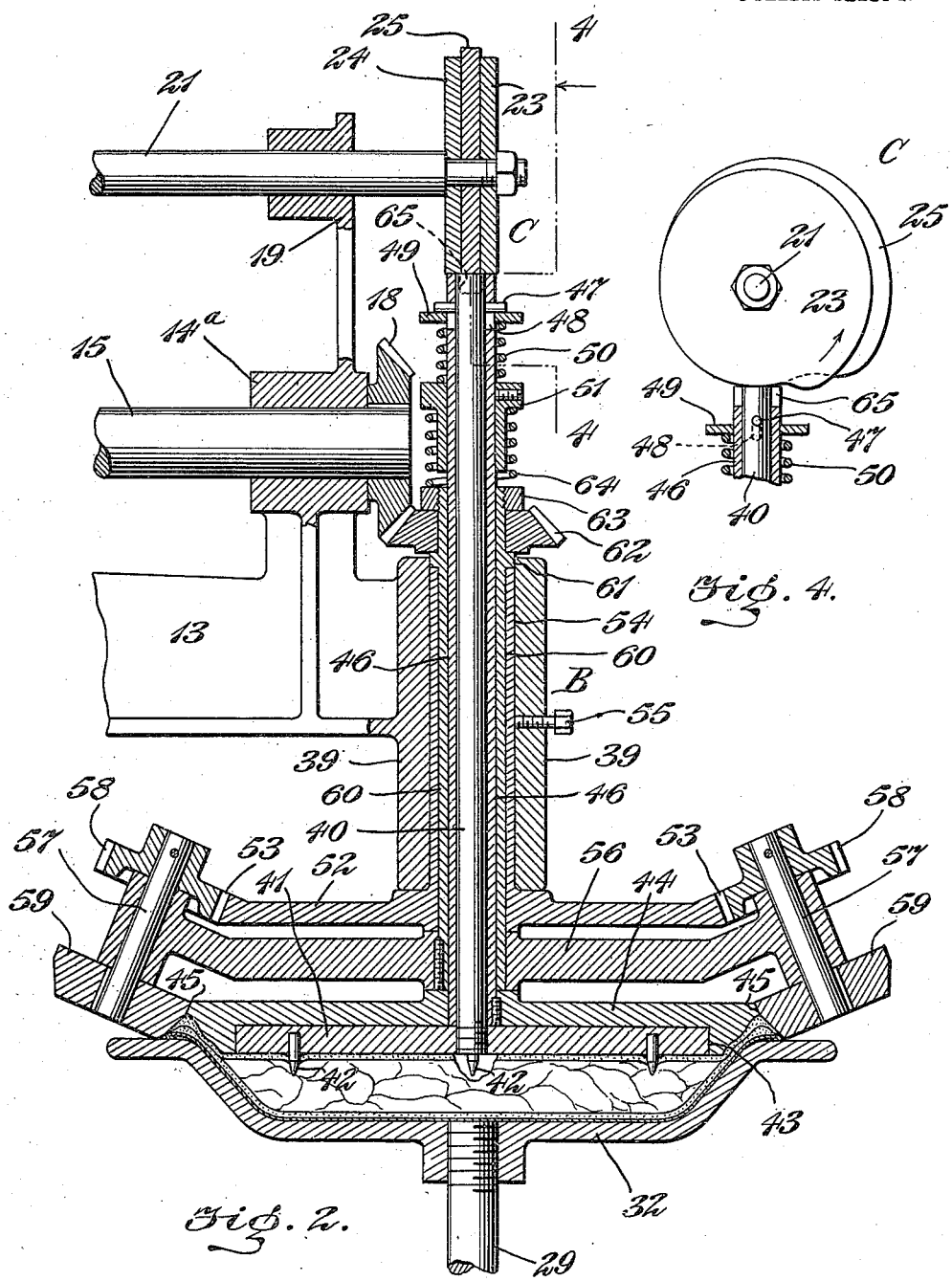
Figure 3:
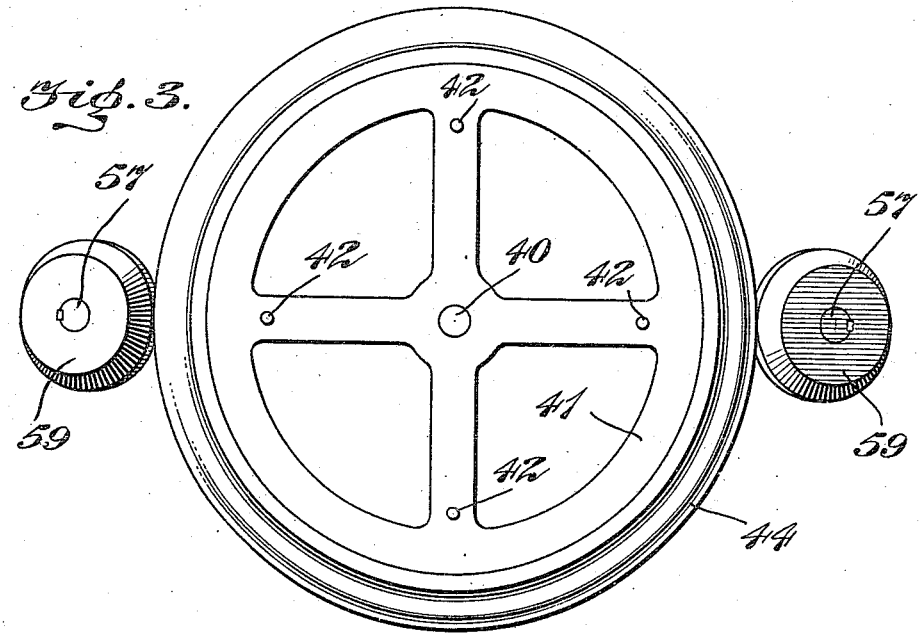
Figure 5:
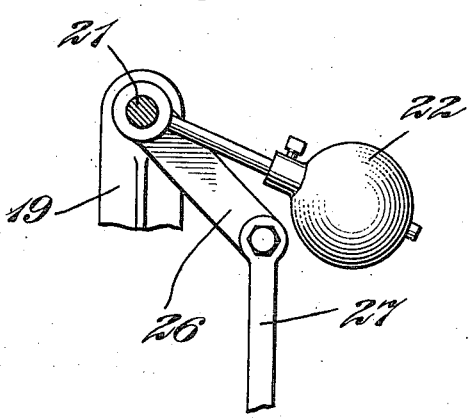

Figure 1 is a side elevation of a pie making machine provided with my improvements, the parts being shown in full lines in their inoperative positions, and being represented in dotted lines as in position for rimming or pinching a pie; Fig. 2 is an enlarged sectional view taken axially through the head of the machine, illustrating features of construction of the rimming or pinching and releasing means, the operative parts being shown in the positions wherein they stand during the forming or molding of the crust; Fig. 3 is an underside view showing the molding or rimming devices carried by the head of the machine; Fig. 4 is a side elevation showing the cams for controlling the operation of the molding or rimming and releasing devices carried by the head, said cams being illustrated in a position to cause the devices controlled by them to assume the positions shown in Fig. 2; Fig. 5 is a sectional detail view taken in the plane indicated by the line 5—5 in Fig. 1, showing certain features of construction of the retracting means which will be hereinafter described; Fig. 6 is a fragmentary sectional view similar to the lower portion of Fig. 2, with the mechanism in the position assumed thereby immediately after the completion of the rimming operation; Fig. 7 is a view similar to Fig. 6, with the mechanism in the position assumed thereby immediately after the releasing means have operated; Fig. 8 is a detached detail view similar to Fig. 4, but showing the controlling cams in the position wherein they stand when the mechanism assumes the position shown in Fig. 6, and Fig. 9 is a view similar to Figs. 4 and 8, with the cams in the position wherein they stand when the mechanism assumes the position illustrated in Fig. 7.

As shown in these views, the improved pie making machine is provided with a table A, forwardly directed from a frame 10 having legs 11, whereby said table is supported at a convenient elevation above the floor, and provided with a standard 12, extended above the table, and having a forward extension 13 at its upper part, positioned above said table A and provided with horizontally alined bearings 14 and 14ᵃ, wherein is journaled a machine shaft 15, the rear extremity of which carries tight and loose pulleys 16 and 17 over which a driving belt or band is adapted to be passed in a well known way in order that said shaft may be driven for the actuation of the various operative parts of the machine as will be hereinafter explained.

The forward extremity of the upper forward extension 13 of the frame standard 12 is provided, in substantial alinement with the center of the table A and at a proper elevation above the same, with a vertically directed bearing 39, which constitutes the head B for the support of certain of the operative devices comprised in the machine, as will be hereinafter described and in said bearing 39 is supported a sleeve 54, held against rotary movement by means of a screw 55 or the like, and provided at its lower part with a circular actuating disk 52, of a diameter considerably greater than that of said bearing 39, beneath which it is extended, and provided with peripheral gear teeth 53 having operative engagement at diametrically opposite sides of said actuating disk or member, with pinions 58, 58, carried upon inclined downwardly and outwardly directed studs 57, 57, which are supported for free turning movement in bearings produced at the outer extremities of diametrically opposite arms 56, 56 secured upon the lower end of a sleeve 60, mounted to turn within the sleeve 54 of the actuating disk or member 52, and provided at its upper part with a collar 61 resting upon the upper edge of said sleeve 54, and with a bevel pinion 62 which has driving engagement with a corresponding bevel gear 18 secured upon the forward extremity of the machine shaft 15, whereby rotary movement is imparted to said sleeve 46 during the operation of the machine.

The construction of the parts, as above described, is such that the sleeve 54 secured within the bearing 39 affords a bushing wherein the sleeve 60 revolves, and said sleeve 60 also forms a bushing wherein an auxiliary sleeve 46 is mounted for endwise movement in a vertical direction, the bore of said auxiliary sleeve 46 being adapted for the passage of a vertically movable rod or shaft 40, capable of endwise movement independently of said auxiliary sleeve 46, and the lower extremity of said auxiliary sleeve 46 serves for the support of a rimming member 44, positioned below the arms 56, 56, and horizontally extended and being made in the form of a disk of proper diameter to fit down over the pie or crust presented thereto upon an appropriate support as will be hereinafter explained, the perimetral parts of said rimming disk or member 44 being formed, as shown in Figs. 2, 6 and 7, for accurate contact upon the inner and upper surfaces of the rim portion of the pie crust in order to mold the same. The lower ends of the oppositely inclined studs 57, 57 rotatively mounted in the extremities of the arms 56, 56 above said rimming disk or member 44, carry auxiliary rimming members 59, 59, made in the form of rollers or disks of small diameter, the upper peripheral surfaces of which are formed for accurate rolling contact upon a similarly formed surface at the upper peripheral part of said rimming disk or member 44, as clearly indicated at 45 upon the drawings, and the lower peripheral surfaces of said auxiliary rimming members or disks 59, 59 being so formed as to be adapted for accurate contact upon the upper and outer surface of the rim of the pie crust, and to travel around said surface outside of said disk or member 44 during the operation of the machine, so as to form or mold the rim of the pie as will be hereinafter explained.

The lower side of the rimming disk or member 44 is provided with a chamber $44^a$, the diameter whereof is made as great as possible without interference with the peripheral molding surface required upon said disk or member for contact with the rim of the pie, and said chamber $44^a$ is adapted to receive and house a releasing plate or member 41, the lower surface of which is substantially flush with the lower surface of the disk or member 44 at points surrounding said chamber $44^a$ when said releasing plate or member is housed within said chamber $44^a$, and said releasing plate or member 41 is carried upon the lower extremity of the rod or shaft 40, which, as above stated, is adapted for endwise vertical movement within the auxiliary sleeve 46, independently of the endwise movement thereof, whereby it will be understood that movement of said rod or shaft 40 in one direction will serve to lift the releasing plate or member 41 and to position the same within the chamber $44^a$, while reverse movement of said rod or shaft 40, will serve to depress said releasing plate 41 below the marginal molding surfaces of the rimming disk or member 44 in the position shown in Fig. 7 of the drawings. As herein shown, the releasing plate 41 is provided with pointed pins 42 pendent from its lower side and adapted to penetrate the upper crust of the pie in a well known way so as to mark the same and allow vents for the escape of the hot gases generated during baking.

63 represents a nut or collar having threaded engagement with the upper extremity of the rotatory sleeve 60, above the bevel pinion 62, and 64 represents a spring coiled about the upper part of the auxiliary sleeve 46 which is extended above said collar 63, and is provided with an adjustable collar 51, between which and said collar 63 the spring 64 is positioned in such fashion as to exert its tension to maintain the auxiliary sleeve 46, together with the rimming disk or member 44 supported at the lower extremity thereof, normally in uplifted position, as shown in Fig. 2, while permitting downward movement of said sleeve 46 and the supported rimming disk or member 44 independently of the auxiliary external rimming members or disks 59, 59, in the positions shown in Figs. 6 and 7. The rimming disk or member 44 has a central boss produced upon its upper surface for contact with a similar boss at the lower end of the sleeve 60, whereby the upward movement of said auxiliary sleeve 46 and the supported rimming disk or member 44 is limited.

The upper extremity of the auxiliary sleeve 46 is provided with diametrically opposite vertically directed slotted openings 48, through which project and play the extremities of a pin 47, held by its central portion to the upper end of the rod or shaft 40 within said auxiliary sleeve 46, and around said upper end of said auxiliary sleeve 46, below the extremities of said pin 47 is mounted a ring or washer 49, between which and the adjustable collar 51 is mounted a spring 50, the tension of which is normally exerted to uplift the rod or shaft 40 within the auxiliary sleeve 46 wherein it is contained in such a manner that the releasing plate or member 41 supported upon the lower end of said rod or shaft is normally uplifted and housed within the chamber 44$^a$ of the rimming disk or member 44, as shown in Fig. 2, while the compressible nature of said spring 50 permits downward movement of the rod or shaft 40 within the limits afforded by the length of the slotted openings 48 and independent of said auxiliary sleeve 46, in order that the releasing plate or member 41 may be depressed below the underside of the rimming disk or member 44 for purposes to be hereinafter explained.

For actuating and controlling the rimming and releasing members 44 and 41, the machine herein illustrated is provided with mechanism indicated at C comprising a horizontally directed shaft 21, mounted for rocking movement in bearings 19, 19 above the upper frame extension 13, and provided at its forward end with a cam device having multiple cam surfaces wherefrom the sleeve 46 and rod or shaft 40 are actuated and moved endwise for the proper actuation and control of said releasing and rimming members as will be hereinafter explained. The rear end of said shaft 21 is provided with an arm having a retracting weight adapted to retract the parts after the operation of the machine, and said rear end of said shaft 21 is also provided with an actuating arm 26, wherewith is connected the upper end of a downwardly directed link or connection 27, the lower end of which is secured to the rear end of a yoke or arm 28, horizontally positioned beneath the table A, and secured at its forward end to the lower part of a vertically extended endwise movable shaft or rod 29, guided in a bearing 30 below the table A and also in a similar bearing at 31 above the said table, and carrying at its upper end a pie support 32 whereon the pie is adapted to be rested in order that it may be lifted during the operation of the machine for presentation to the rimming or molding devices supported by the head B above said table A.

The lower extremity of the vertically movable rod or shaft 29 which carries the pie support 32 has a forwardly directed arm 33, wherewith is connected one end of a chain or equivalent flexible connection which is upwardly extended from said arm around a sprocket wheel 35 mounted to turn on a bracket 36 at the under side of the forward part of table A, and said chain 34 after passing over said wheel 35 is downwardly directed as shown in Fig. 1 and has connection with the forward end of a normally uplifted treadle 37, pivoted by its rear end at 38 upon the frame and in convenient position to be depressed by the foot of the attendant.

By this construction of the parts it will be evident that the actuating disk or member 50 being held stationary, while the sleeve 60 is geared to shaft 15, the intermeshing gear surfaces of the member 50 and pinions 58, 58 will serve to impart rapid rotatory movement to the studs 57, 57 and auxiliary rimming disks or members 59, 59 while said auxiliary members revolve about the rimming member 44, while at the same time the member 44 is capable of such vertical movement as will serve either to engage its upper peripheral surface 45 in rolling contact with the corresponding surfaces of said auxiliary disks 59 or will withdraw said member 44 downwardly out of contact with and below said auxiliary members or disks 59, and when the treadle 37 is depressed by the attendant, its connection with shaft or rod 29 will serve to elevate the pie support 32 to present a pie rested thereon in position to be operated upon by the rimming or molding devices supported by the head B, while the connection between said shaft or rod 29 and the rock shaft 21 at the upper part of the machine insures control of the rimming and releasing means supported by the head in unison with the movement of the pie support 32 toward or from the same. The retracting weight 22 upon shaft 21, and the weight of the pie support, rod 29 and yoke 28 serve to retract the parts to the positions shown in Fig. 1 after each operation of the machine.

The structure of the cam device for controlling the vertical reciprocatory movements of the sleeve 46 and rod or shaft 40 is shown in detail in Figs. 2, 4, 8 and 9, and comprises lateral cam disks 24 and 25 held on shaft 21 and provided with cam surfaces of similar contour capable of controlling contact at opposite sides of the upper extremity of the auxiliary sleeve 46, the central portion of which is cut or notched out as represented at 65 at diametrically opposite sides for the reception of a projecting cam surface produced at the perimeter of a cam disk 25 held upon the shaft 21 between the aforesaid cam disks 23 and 24 and which is thus permitted to have controlling contact upon the uppermost extremity of the rod or shaft 40 within the sleeve 46 in order that the same may be moved endwise and vertically independently of said sleeve at times appropriate for the contemplated operation of the rimming and releasing means.

The operation of the machine constructed as above described is as follows: A pie plate having dough suitably prepared, as indicated in Figs. 2, 6 and 7, is rested upon the pie support 32 while the same is in the lowered position shown in full lines in Fig. 1, after which the treadle 37 is depressed by the attendant, carrying the pie support 32 upward in such fashion as to present the supported pie to the rimming and molding devices supported by the head of the machine, and simultaneously actuating the controlling means C through the medium of the connecting link 27 and crank arm 26. In the initial position of the parts, prior to the operation of the treadle, the cam devices at the forward end of shaft 21 stand in the positions shown in Fig. 6 of the drawings, both the auxiliary sleeve 46, and the rod or shaft 40 being depressed to the limits of their respective downward movements against the tension of their retracting springs 64 and 50, so that the rimming disk or member 44 is depressed in order to withdraw its perimetral molding surface below the revolving auxiliary rimming members or disks 59, 59 at diametrically opposite sides thereof, while the releasing plate or member 41 is, at the same time depressed below the lower surface of said rimming disk or member 44, as clearly illustrated in Fig. 7 of the drawings. Pursuant to the actuation of the treadle 37 by the attendant, as above described, the rocking of shaft 21 will serve to turn the cam disks 23, 24, and 25 in the direction indicated by the arrow in Fig. 4, whereby the projecting cam surface of the central cam disk 25 is withdrawn from the notched or cut out portion 65 at the upper end of the actuating sleeve 46, and said cam surface being thereby withdrawn from controlling contact upon the upper extremity of the rod or shaft 40, the spring 50 is at once permitted to exert its tension to uplift said rod or shaft to such an extent as may be needful to house the retracting plate or member 41 within the chamber 44$^a$ at the underside of the rimming member 44, the parts thereupon assuming the positions shown in Figs. 6 and 8.

It will be seen from the drawings that a comparatively small extent of movement of shaft 21 in the direction of the arrows shown in Figs. 8 and 9 will serve to withdraw the cam surface of disk 25 from contact with rod or shaft 40, and the proportion and arrangement of the parts is such that this release of said rod or shaft 40 from said cam surface occurs during the commencement of the upward stroke of the pie support 32 so that by the time the supported pie shall have been elevated in position for contact upon the molding or forming surfaces of the rimming member or disk 44, the releasing plate or member 41 will have been uplifted within the chamber 44$^a$ in order that its lower surface may be substantially flush with that of said rimming disk or member, and thereby avoid liability of marring or injuring the top surface of the pie rested upon the support 32. The pie rested upon the pie support being now elevated in contact with the molding or forming surfaces of the rimming disk or member 44, which is adapted to form or mold the inner and upper surfaces of the crust-rim, further upward movement of the pie support will be synchronous with the upward movement of the rimming disk or member 44, so that the pie will, during such further upward movement, be contained between the pie support 32 and said disk or member 44 with only the marginal portion of the crust-rim exposed, the perimetral cam surfaces of the disks 23 and 24, which control the upward movement of said disk or member 44 being of such contour as to insure such synchronous movement of the parts. The continued movement of shaft 21 in unison with such further upward movement of the pie support 32 and in the direction indicated by the arrow in Fig. 4, eventually disengages the perimetral cam surfaces of the outermost disks 23 and 24 from the upper end of the auxiliary sleeve 46, this result being timed to occur at the instant that the rimming disk or member 44 is engaged in rolling contact with the auxiliary members 59, 59, which thereupon contact with the exposed marginal portion of the rim of the pie crust and by rolling around the same operate to lift the same into the desired form in a well known manner, as clearly shown in Fig. 2 of the drawings.

The parts are so proportioned, as shown in the drawings, that the auxiliary rimming disks or members 59, 59, operate in conjunction with the marginal rim of the pie plate, as indicated in Fig. 2, to trim off the edges of the crust around the outer edge of said plate, so that superfluous dough may be removed from the rim of the pie. The result may evidently be attained by so forming the parts that the members or disks 59, 59 roll in contact with either the margin of the pie plate or with the marginal part of the pie support. The molding and trimming of the pie having been thus accomplished, the attendant relaxes pressure upon the treadle, so that the retracting means are permitted to reversely move the parts, the pie support 32 commencing its descending movement, which is accomplished in unison with the descent of the members 44 and 41 by reason of the peculiar arrangement of the controlling cam surfaces, as above described, the synchronous downward movement of the pie support and said members 44 and 41 continuing until the parts shall have assumed a position substantially as shown in Figs. 6 and 8, cams 23, 24 and 25 meanwhile moving in the direction shown by the arrow in Fig. 4, whereby it will be evident that the pie is pressed downward in such a manner as to insure the detachment of the marginal portion of its crust rim from the auxiliary rimming members or disks 59, 59, without liability of such adherence as might damage the molded surface of said rim. During this initial downward movement of the parts for the disengagement of the auxiliary rimming disks or members 59, 59 from the crust rim, the members 44 and 41 move in unison with each other, the spring 50 being permitted to operate to retain member 41 in chamber 44$^a$, but after the crust rim has been disengaged from said members 59, the pie sometimes adheres with such force to the disk or member 44 that, when said member reaches the limit of its downward movement, the continued descent of the pie support 32 leaves the pie suspended from said member 44 as indicated in Fig. 6 of the drawings. When this occurs in machines of this general character such as have been hitherto devised, damage to the pie often results. But in the machine herein shown, constructed according to my invention, the member 41 is capable of a certain extent of independent descending movement after the member 44 shall have reached the limit of its downward movement, such independent descending movement of said member 41 being due to the peculiar conformation of the cam 25 which, during the movement of shaft 21 in the direction of the arrows in Figs. 8 and 9, and coincident with the downward movement of the pedal 37 and pie support 32, assumes the position shown in Fig. 9, whereby the rod 40 whereon member 41 is supported is pushed down within the bore of the auxiliary sleeve 46 carrying member 44, and serves to depress the member 41 independently of said member 44 after the completion of the downward movement of said member 44 under the influence of cams 23 and 24.

Since the member 41 bears against the central part of the pie, inside of the crust rim wherewith the peripheral portions of member 44 are engaged, it will be evident that this independent descending movement imparted to member 41 as above described will operate to force the pie downwardly in such a way as to effectively disengage its crust rim from the peripheral molding surfaces of the member 44 whereby adherence of the pie to said member is prevented and the pie is caused to descend with the pie support 32. It will thus be evident that the releasing plate or member 41, rimming disk or member 44, and auxiliary rimming disks or members 59, 59, are capable of such relative movement as will permit them to be successively engaged and disengaged from the pies carried by the pie support 32 in proper order to insure the greatest efficiency in operation and to effectively prevent damage to the product, the independent movement of the parts requisite for effecting such successive engagement and disengagement thereof with and from the pies being controlled by the cam devices in such a manner as to render the machine substantially automatic in its operation, and to dispense with the exercise of any particular care or skill on the part of the attendant.

From the above description of my invention, it will be seen that the improved pie making machine embodying my improvements is of an extremely simple and comparatively inexpensive nature and is particularly well adapted for use by reason of the substantially automatic character of its operation, and its efficiency for practical use, and it will also be obvious from the above description that the machine is susceptible of considerable change without material departure from the principles and spirit of the invention, and for this reason I do not desire to be understood as limiting myself to the precise formation and arrangement of the several parts herein set forth in carrying out my invention in practice.

Having thus described my invention, what I claim and desire to secure by Letters Patent is:

1. A machine of the character described having a vertically movable pie support, a rimming device above the pie support and vertically movable toward and from the same, an auxiliary rimming disk engageable with the peripheral part of said first-named rimming device, means for rotating said auxiliary rimming disk, a releasing device below the first-named rimming device, and means for timedly moving the releasing device relatively to said first-named rimming device and to the pie support for releasing the pie from said rimming device when the pie support is lowered.

2. In a machine of the character described, the combination of a support having a head, a driving shaft, a rimming device carried by the head, means carried by the head for coöperation with said rimming device to complete the rimming operation, a releasing device also carried by the head, a pie support movable toward and from the head, and cam devices for operating the rimming and releasing devices in predetermined order.

3. A machine of the character described having a pie support, a plurality of rimming members capable of conjoint relative rotation to rim a pie carried by said support, and mechanism capable of operation to disengage said rimming members successively from the pie carried by said support.

4. A machine of the character described having a pie support, rimming means including a plurality of rotatable rimming members, capable of conjoint operation to rim a pie carried by said support, a releasing member capable of operation to release a pie from said rimming means, and mechanism capable of successive operation first to move one of said rimming members out of operative relation to the other rimming member, and afterward to actuate said releasing member to release the pie from said rimming means.

5. A machine of the character described having rimming means including a plurality of rotating rimming members capable of conjoint operation to rim a pie, a pie support capable of movement into and out of position to present a supported pie to said rimming means, and mechanism actuated during the movement of said pie support, and capable of successive operation first to move one of said rimming members out of operative relation to the other rimming member, and afterward to disengage the pie from said rimming means.

6. A machine of the character described having rimming means including a plurality of rotating rimming members capable of conjoint operation to rim a pie, a pie support capable of movement into and out of position to present a supported pie to said rimming means, a releasing member capable of operation to release a pie from said rimming means, and mechanism actuated during the movement of said support and capable of successive operation first to move one of the rimming members out of operative relation to the other rimming member, and afterward to disengage the pie from said rimming means.

7. A machine of the character described having rimming means including a plurality of rotatable rimming members capable of conjoint operation to rim a pie, a pie support capable of movement into and out of position to present a supported pie to said rimming means, and mechanism for actuating said pie support adapted for successive operation first to move one of said rimming members out of operative relation to the other rimming member, and afterward to disengage the pie from said rimming means.

8. A machine of the character described having rimming means including a plurality of rotatable rimming members, capable of conjoint operation to rim a pie, a pie support capable of movement out of and into position to present a supported pie to said rimming means, a releasing member capable of operation to release a pie from said rimming means, and mechanism for actuating said pie support adapted for successive operation first to move one of said rimming members out of operative relation to the other rimming member, and afterward to actuate said releasing member to release the pie from said rimming means.

9. A machine of the character described having rimming means including a plurality of rotatable rimming members, capable of conjoint operation to rim a pie, a pie support capable of movement into and out of position to present a supported pie to said rimming means, and mechanism actuated during the movement of said pie support and capable of operation to move one of said rimming members out of operative relation to the other rimming member.

10. A machine of the character described having rimming means including a plurality of rotatable rimming members capable of conjoint operation to rim a pie, a pie support capable of movement into and out of position to present a supported pie to said rimming means and mechanism for actuating said pie support capable of operation to move one of said rimming members out of operative relation to the other rimming member.

11. A machine of the character described having three members, two of which are rimming members conjointly operable to rim a pie, and the other of which is a pie support, said members being relatively movable to adjust the conjointly operable rimming members in and out of position for operative relation with a pie carried by the pie support and mechanism operable to disengage the rimming members successively from a pie carried by the said support.

12. A machine of the character described having a pie support, a mold member mounted for movement with relation to the support, a releasing means carried by the mold member having movement independent thereof, a rimming member carried by the mold member acting conjointly therewith.

In witness whereof I have hereunto signed my name this 2nd day of May 1908, in the presence of two subscribing witnesses.

JOHN F. KOHLER.

Witnesses:
J. FRED ACKER,
WILLIAM BETTS.

Copies of this patent may be obtained for five cents each, by addressing the "Commissioner of Patents, Washington, D. C."